United States Patent
Shibata

(10) Patent No.: US 9,223,523 B2
(45) Date of Patent: Dec. 29, 2015

(54) METHOD, PROGRAM PRODUCT AND IMAGE FORMING SYSTEM FOR STORING PRINTER PROFILE OF PAPER TO BE PRINTED ON AND TRANSMITTING RASTERIZED AND COLOR CORRECTED PRINT JOB FROM MASTER RIP TO SLAVE RIP

(71) Applicant: KONICA MINOLTA, INC., Chiyoda-ku (JP)

(72) Inventor: Kuniyasu Shibata, Kawasaki (JP)

(73) Assignee: Konica Minolta, Inc., Chiyoda-ky, Tokyo (JP)

( * ) Notice: Subject to any disclaimer, the term of this patent is extended or adjusted under 35 U.S.C. 154(b) by 0 days.

(21) Appl. No.: 14/447,697

(22) Filed: Jul. 31, 2014

(65) Prior Publication Data
US 2015/0049365 A1   Feb. 19, 2015

(30) Foreign Application Priority Data
Aug. 14, 2013   (JP) ................. 2013-168638

(51) Int. Cl.
G06K 15/02 (2006.01)
G06F 3/12 (2006.01)
H04N 1/60 (2006.01)

(52) U.S. Cl.
CPC ............ *G06F 3/1204* (2013.01); *G06F 3/1208* (2013.01); *G06F 3/1247* (2013.01); *G06F 3/1257* (2013.01); *G06F 3/1267* (2013.01); *G06F 3/1282* (2013.01); *G06K 15/1818* (2013.01); *G06K 15/1836* (2013.01); *G06K 15/1878* (2013.01); *H04N 1/6052* (2013.01); *H04N 1/6097* (2013.01)

(58) Field of Classification Search
None
See application file for complete search history.

(56) References Cited

U.S. PATENT DOCUMENTS

| | | | | |
|---|---|---|---|---|
| 6,750,980 | B1 * | 6/2004 | Shimura | G06K 15/00 358/1.1 |
| 7,268,910 | B2 * | 9/2007 | Catt | G06K 15/02 358/1.17 |
| 2008/0068663 | A1 * | 3/2008 | Broddin | H04N 1/6052 358/3.24 |
| 2012/0307297 | A1 | 12/2012 | Teshima | |
| 2013/0222819 | A1 * | 8/2013 | Johnson | G06K 15/1823 358/1.6 |

FOREIGN PATENT DOCUMENTS

| | | |
|---|---|---|
| JP | 2006-198880 | 8/2006 |
| JP | 2010-021732 A | 1/2010 |

OTHER PUBLICATIONS

European Search Report issued in corresponding European Patent Application No. 14178285.4-1959, dated Dec. 17, 2014.

* cited by examiner

*Primary Examiner* — Scott A Rogers
(74) *Attorney, Agent, or Firm* — Buchanan Ingersoll & Rooney PC

(57) ABSTRACT

An image forming method using an image forming system including a master RIP and at least one slave RIP is provided. The slave RIP stores a printer profile of every paper to be printed by a printer connected to the slave RIP, registers paper relating information associating the printer profile with the paper and including a storage place for the printer profile, and transmits the paper relating information and the printer profile respectively to the master RIP. The master RIP receives the paper relating information and the printer profile, sets a paper in a print job, acquires the printer profile from the storage place associated with the set paper in the paper relating information, conducts color conversion of the print job by the printer profile instead of the slave RIP, and transmits the print job subjected to the color conversion to the slave RIP.

9 Claims, 12 Drawing Sheets

FIG.6A

```
<?xml version="1.0" encoding="UTF-8"?>
<JMF xmlns="http://www.CIP4.org/JDFSchema_1_1" ICSVersions="JMF_L2-1.3 MIS_L2-1.3 Base_L2-1.3"
MaxVersion="1.3" Version="1.3" xmlns:xsi="http://www.w3.org/2001/XMLSchema-instance">
  <Query ID="20120303154611" Type="Resource" xsi:type="QueryResource">
    <Subscription URL="http://192.168.100.100/jmf"/>
    <ResourceQuParams ResourceName="Media" />
  </Query>
</JMF>
```

FIG.6B

```
<?xml version="1.0" encoding="UTF-8"?>
<JMF xmlns="http://www.CIP4.org/JDFSchema_1_1" Version="1.3"
xmlns:xsi="http://www.w3.org/2001/XMLSchema-instance">
  <Response ID="ID20120303154611" Type="Resource" refID="20120303154611"
  xsi:type="ResponseResource">
    <ResourceInfo ResourceName="Media">
      <Media Class="Consumable" DescriptiveName="A4 Coated Paper" MediaType="Coat"
      Dimension="841.88976378 595.27559055" PrePrinted="false" ProductID="1" Weight="90"/>
      <FileSpec MimeType="application/vnd.iccprofile"
      URL="http://192.168.1.110/icc/Toner_Coat.icc"/>
    </ResourceInfo>
    <ResourceInfo ResourceName="Media">
      <Media Class="Consumable" DescriptiveName="A3 Plain Paper " MediaType="Plain"
      Dimension="841.88976378 1190.5511811" PrePrinted="false" ProductID="1" Weight="105"/>
      <FileSpec MimeType="application/vnd.iccprofile"
      URL="http://192.168.1.110/icc/Toner_Plain_Paper.icc"/>
    </ResourceInfo>
    ...
  </Response>
</JMF>
```

FIG.7

```
<?xml version="1.0" encoding="UTF-8"?>
<JMF xmlns="http://www.CIP4.org/JDFSchema_1_1" Version="1.3"
xmlns:xsi="http://www.w3.org/2001/XMLSchema-instance">
 <Singal ID="ID20120303154611" Type="Resource" refID="20120303154611"
 xsi:type="SignalResource">
  <ResourceInfo ResourceName="Media">
   <Media Class="Consumable" DescriptiveName=" A4 Coated Paper " MediaType="Coat"
   Dimension="841.88976378 595.27559055" PrePrinted="false" ProductID="1" Weight="90"/>
    <FileSpec MimeType="application/vnd.iccprofile"
    URL="http://192.168.1.110/icc/Toner_Coat.icc"/>
  </ResourceInfo>
  <ResourceInfo ResourceName="Media">
   <Media Class="Consumable" DescriptiveName=" A3 Plain Paper " MediaType="Plain"
   Dimension="841.88976378 1190.5511811" PrePrinted="false" ProductID="1" Weight="105"/>
    <FileSpec MimeType="application/vnd.iccprofile"
    URL="http://192.168.1.110/icc/Toner Plain Paper.icc"/>
  </ResourceInfo>
  ...
 </Response>
</JMF>
```

FIG.9A

| Tonner Printer NO. 1 | ∨ ≡ |
|---|---|
| Tonner Printer NO. 1 | |
| Tonner Printer NO. 2 | |
| Tonner Printer NO. 3 | |
| Tonner Printer NO. 4 | |
| Inkjet Printer NO. 1 | |
| Inkjet Printer NO. 2 | |
| Inkjet Printer NO. 3 | |

FIG.9B

| SRA3 Coated Paper | ∨ ≡ |
|---|---|
| A4 Coated Paper | |
| A3 Plain Paper | |
| 330 x 487 mm Coated Paper | |
| 330 x 487 mm Plain Paper | |
| A4 High Quality Paper | |
| A3 High Quality Paper | |
| 330 x 487 mm High Quality Paper | |

FIG.9C

| Conduct in CTP-RIP (Raster PDF) | ∨ |
|---|---|
| Conduct in CTP-RIP (Raster PDF) | |
| Output Intent (Vector PDF) | |
| Output Intent (Raster PDF) | |

FIG.10

```
<?xml version="1.0" encoding="UTF-8"?>
<JDF Activation="Active" Category="DigitalPrinting" ColorConvMethod="CenterRIP_Raster"
...
<ResourcePool>
<LayoutPreparationParams Class="Parameter"
    ID="r090407_065624623_030062" Sides="OneSidedFront" Status="Available"/>
<RunList Class="Parameter" ID="r090407_065624623_030063" Status="Available">
  <RunList Pages="0 ~ -1">
  <LayoutElement>
    <FileSpec MimeType="application/pdf" URL="http://192.168.100.100/pdf/raster.pdf"/>
  </LayoutElement>
  </RunList>
</RunList>
</ResourcePool>
...
<ResourceLinkPool>
<LayoutPreparationParamsLink CombinedProcessIndex="0"
    Usage="Input" rRef="r090407_065624623_030062"/>
<RunListLink CombinedProcessIndex="0 1" ProcessUsage="Document"
    Usage="Input" rRef="r090407_065624623_030063"/>
...
</ResourceLinkPool>
</JDF>
```

FIG.12A

| Name | A4 Coated Paper |
|---|---|

| Size ▽ |
|---|
| A4 |
| A3 |
| ... |
| Indefinite Shape |

| Kind of Paper ▽ |
|---|
| Plain Paper |
| High Quality Paper |
| Coated Paper |
| ... |

| Weight ▽ |
|---|
| 71-80 |
| 81-90 |
| 91-105 |
| ... |

| Kind of Paper | Printer Profile | |
|---|---|---|
| Plain Paper | Toner_Plain Paper.icc | |
| High Quality Paper | Toner_High_Quality.icc | |
| Coated Paper | Toner_Coat.icc | |
| ⋮ | Toner_High_Quality.icc<br>Toner_Coat.icc | |

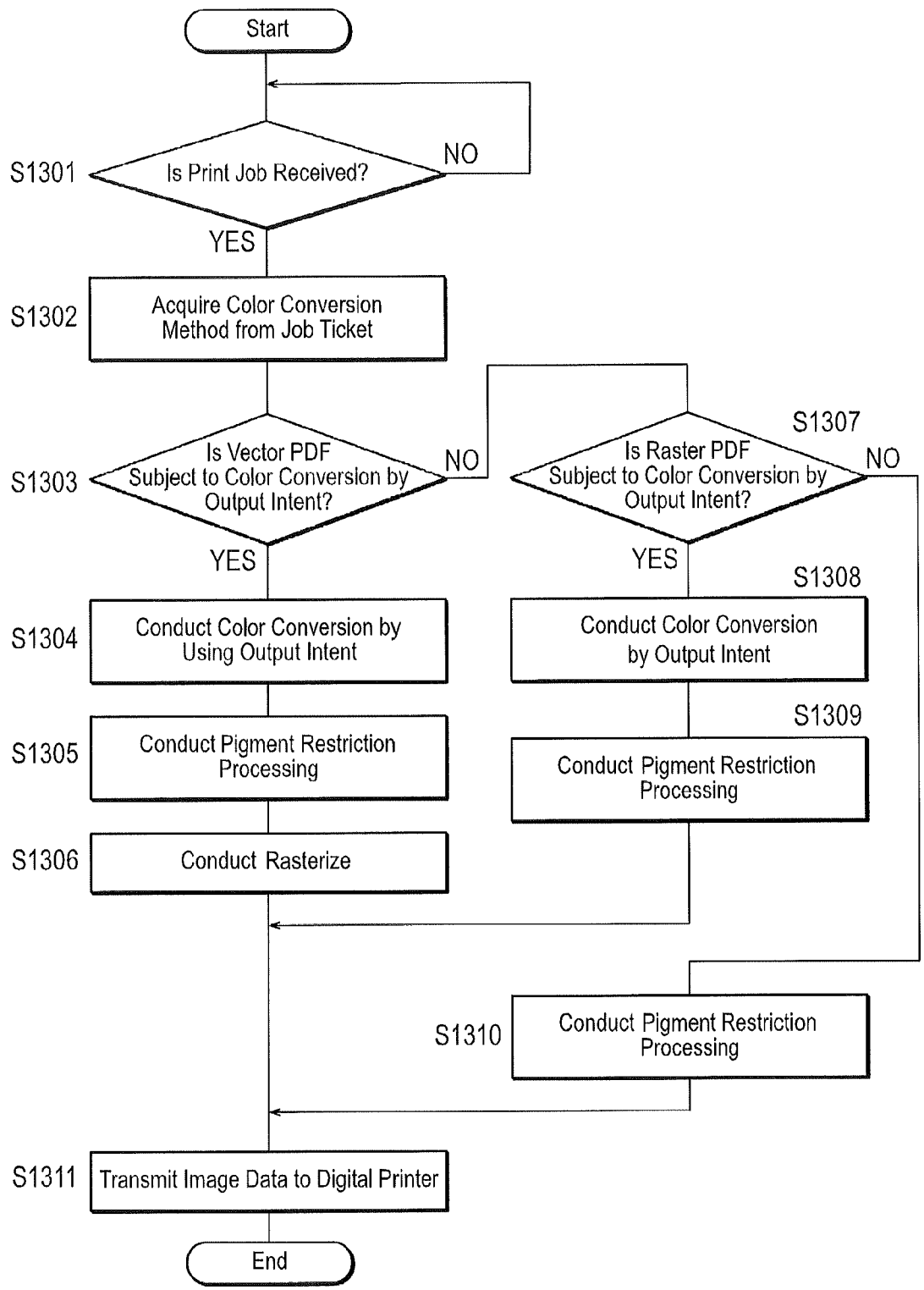

METHOD, PROGRAM PRODUCT AND IMAGE FORMING SYSTEM FOR STORING PRINTER PROFILE OF PAPER TO BE PRINTED ON AND TRANSMITTING RASTERIZED AND COLOR CORRECTED PRINT JOB FROM MASTER RIP TO SLAVE RIP

CROSS-REFERENCE TO RELATED APPLICATION

This application is based on Japanese Patent Application No. 2013-168638 filed on Aug. 14, 2013, the contents of which are incorporated herein by reference.

BACKGROUND

1. Technical Field

The present invention relates to an image forming method, a non-transitory computer readable storage medium stored with a program for image forming system, and an image forming system.

2. Description of Related Art

Papers printed by a printer differ in quantity of a color material that can be absorbed by them because the composition and thickness differ according to the kind of paper. Therefore, the quality variation of a printed matter due to a difference in paper property is prevented by conducting color conversion of image data using a suitable printer profile for every paper respectively and printing resultant image data on the paper.

As for a conventional technique for conducting color conversion on image data by using a suitable printer profile for every paper respectively, there is a technique described in Unexamined Japanese Patent Publication No. 2010-21732. That is, a physical property value of a paper and a printer profile are associated with each other and stored in an RIP (Raster Image Processor), and image data is subject to color conversion conducted by the printer profile corresponding to a physical property value similar to the physical value of a paper to be printed which is input by a user. As a result, image data is subject to color conversion by the profile suitable for the paper, and consequently the quality of the printed matter is improved.

SUMMARY

In a system having a plurality of RIPs such as a hybrid work flow CMS (Color Management System), however, the following problem would occur. That is, in the system having a plurality of RIPs, rasterize processing of a print job in each RIP is replaced by rasterize processing conducted by a representative RIP in order to secure uniformity of drawing in the rasterize processing. In that case, in the representative RIP, color conversion is conducted with a printer profile different from a printer profile of every paper included in respective RIPs other than the representative RIP. This results in a problem that the color of a print image changes due to replacement of rasterize processing and color conversion of a print job by those conducted by the representative RIP. The abovementioned conventional technique cannot solve such a problem because it is a technique that can be applied to only a system having one RIP.

The present invention has been made to solve the abovementioned problem. That is, according to the present invention, in the hybrid work flow CMS, paper relating information associating a paper with a printer profile and including storage places of the printer profiles is registered in each slave RIP. And the master RIP receives the paper relating information from the slave RIP and sets a paper to be printed by a printer connected to the slave RIP, in a print job. And the master RIP receives the printer profile from the storage place of the printer profile associated with the paper, which is included in the paper relating information, and conducts rasterize processing and color conversion of the print job by using the received printer profile instead of the slave RIP. Thereby, objects are to prevent the color of the print image from changing due to rasterize processing and color conversion conducted in different RIPs along with keeping the uniformity of drawing of printed matters, and facilitating management of the printer profiles among a plurality of RIPs, so that improvement of efficiency of working conducted by the user is achieved.

To achieve at least one of the abovementioned objects, an image forming method reflecting one aspect of the present invention comprises the following. The image forming method in an image forming system including a master RIP and at least one slave RIP, the master RIP conducting rasterize processing of a print job for causing a first printer connected to the master RIP to print, and the master RIP being capable of conducting rasterize processing of a print job for causing a second printer connected to the slave RIP to print by the slave RIP, instead of the slave RIP, the image forming method comprising: step (a) of storing, in the slave RIP, a printer profile of every paper to be printed by the second printer; step (b) of registering, in the slave RIP, paper relating information associating the printer profile stored at the step (a) with the paper and including a storage place for the printer profile in the slave RIP; step (c) of transmitting the paper relating information registered at the step (b) and the printer profile stored at the step (a) respectively from the slave RIP to the master RIP; step (d) of receiving, in the master RIP, the paper relating information and the printer profile transmitted at the step (c); step (e) of setting, in the master RIP, the paper to be printed by the second printer, in the print job; step (f) of acquiring, in the master RIP, the printer profile stored in the storage place for the printer profile associated with the paper set at the step (e) in the print job in the paper relating information received at the step (d), from the slave RIP; step (g) of conducting, in the master RIP, rasterize processing and color conversion of the print job by using the printer profile acquired at the step (f) instead of the slave RIP; and step (h) of transmitting the print job subjected to the rasterize processing and color conversion at the step (g) from the master RIP to the slave RIP.

It is preferable that, at the step (c), the paper relating information is transmitted to the master RIP when there is a request from the master RIP or the paper relating information registered at the step (b) is updated.

It is preferable that, at the step (c), the printer profile is transmitted to the master RIP in accordance with a request from the master RIP when the master RIP conducts the rasterize processing and color conversion of the print job at the step (g).

The objects, features, and characteristics of this invention other than those set forth above will become apparent from the description given herein below with reference to preferred embodiments illustrated in the accompanying drawings.

BRIEF DESCRIPTION OF THE DRAWINGS

FIGS. 6A and 6B are diagrams illustrating an example of an enquiry of the paper relating information and a response of the paper relating information described in a communication format of a print apparatus.

FIG. 7 is a diagram illustrating an example of an notice of update of the paper relating information described in JMF.

FIGS. 9A to 9C are diagrams illustrating a display of a list of printers, a display of a list of papers, and a display of a list of color conversion methods for causing a user to select the printer, the paper, and the color conversion method, respectively.

FIG. 10 is a diagram illustrating an example of a job ticket included in the print job described in a communication format of the print apparatus and transmitted from the CTP-RIP to the digital RIP.

FIGS. 12A and 12B are diagrams illustrating a user interface in a digital RIP client application for causing the user to update and register the paper relating information.

FIG. 13 is a flow chart illustrating processing conducted by a print job control part in the digital RIP.

DETAILED DESCRIPTION

Hereafter, an image forming method, a non-transitory computer readable storage medium stored with a program for image forming system, and an image forming system according to an embodiment of the present invention will be described in detail with reference to the drawings.

Figure 1:
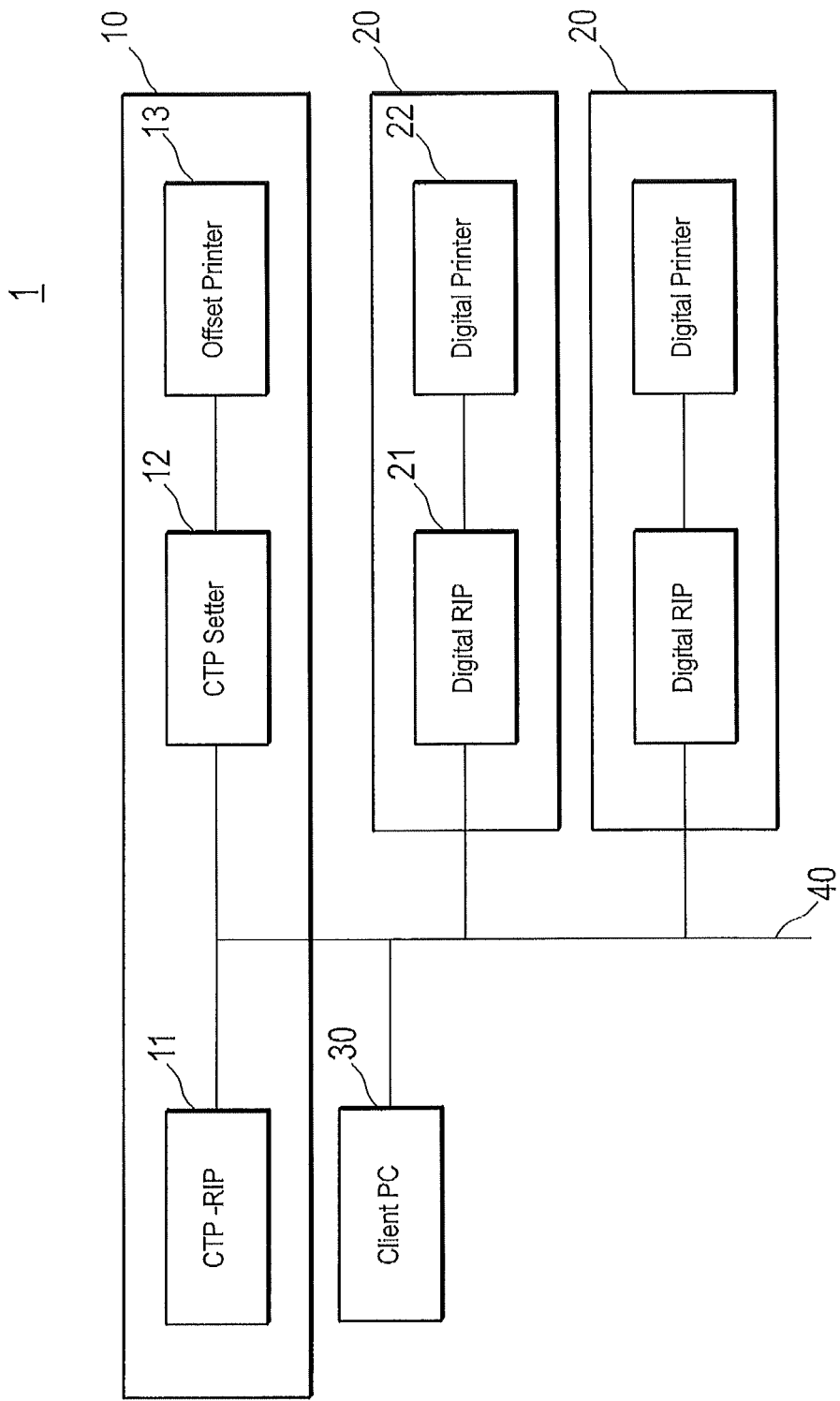
FIG. 1 is a block diagram illustrating an image forming system according to an embodiment of the present invention.

FIG. 1 is a block diagram illustrating an image forming system according to an embodiment of the present invention.

As shown in FIG. 1, an image forming system 1 includes an offset print system 10, a plurality of digital print systems 20, and a client PC (Personal Computer) 30. By the way, the number of digital print systems 20 may be one.

The image forming system 1 constitutes a hybrid work flow CMS (Color Management System) by including such components.

The offset print system 10 constitutes a master RIP, and each of the digital print systems 20 constitutes a slave RIP.

As shown in FIG. 1, the offset print system 10, the plurality of digital print systems 20, and the client PC 30 are connected via a network 40 to be capable of communicating with each other. The network 40 can be configured by using a LAN (Local Area Network) which connects computers and network devices according to standards such as Ethernet (registered trademark), Token Ring, and FDDI (Fiber-Distributed Data interface), or a WAN (Wide Area Network) which connects LANs by an exclusive line.

The offset print system 10 includes a CTP-RIP (Computer To Plate-Raster Image Processor) 11, a CTP setter 12, and an offset printer 13. The CTP-RIP conducts generation of a print job and rasterize processing and color conversion of the print job. Here, the print job is a general term of print instructions to a printer and includes print data and print setting. Print data is data of a document to be printed, and could include various data such as, for example, image data, vector data (graphics data) and text data. Specifically, the print data could be PDL (Page Description Language) data, PDP (Portable Document Format) data, or TIFF (Tagged Image File Format) data. The print setting includes the printer that is caused to conduct printing, the paper for printing, and a color conversion method for every kind of document. Rasterize processing refers to converting print data included in the print job to a form of image data (for example, bitmap form) in which an image can be printed by a printer. The color conversion method refers to conducting color conversion of data having a specified data form by a specified RIP or output intent. The color conversion method refers to, for example, conducting color conversion of a raster PDF by the CTP-RIP 11. The output intent refers to causing a printer profile including a standard color space to be embedded in print data to conduct color conversion on print data by the printer profile including a standard color space. The CTP setter fabricates a plate for offset printing based on image data obtained by conducting the rasterize processing and color conversion of the print job. The offset printer 13 conducts offset printing by using the plate.

The digital print system 20 includes a digital RIP 21 and a digital printer 22. The digital RIP 21 conducts rasterize processing and color conversion of the print job. The digital printer 22 prints an image based on image data obtained by conducting the rasterize processing and color conversion of the print job, on a paper according to a no-plate print method which does not use the plate. The digital printer 22 can be configured by, for example, a laser beam printer or an inkjet printer.

The client PC 30 transmits various instructions by a user to the offset print system 10 and the digital print system 20, and displays a progress situation of the print job in the offset print system 10 and the digital print system 20.

Figure 2:
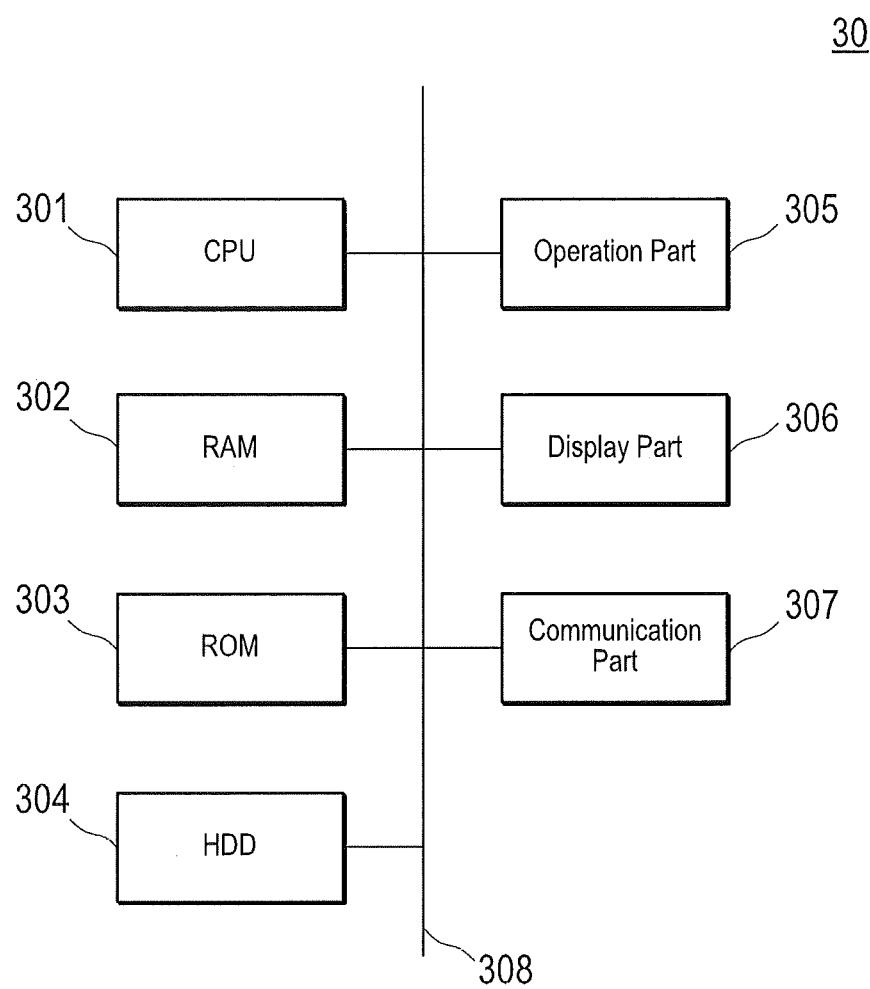
FIG. 2 is a block diagram illustrating a configuration of a client PC.

FIG. 2 is a block diagram illustrating a configuration of the client PC.

As illustrated in FIG. 2, the client PC 30 includes a CPU (Central Processing Unit) 301, RAM (Random Access Memory) 302, ROM (Read Only Memory) 303, a HDD (Hard Disk Drive) 304, an operation part 305, a display part 306, and a communication part 307. These parts are connected to each other via a bus 308 for exchanging signals.

The CPU 301 conducts control of the abovementioned parts and various kinds of arithmetic processing in accordance with a program.

The RAM 302 temporarily stores programs and data as a working area.

The ROM 303 stores various programs and various data.

The HDD 304 stores an operating system, a CTP-RIP client application, a digital RIP client application, a printer driver, and other various programs and various data.

The CTP-RIP client application is a program for causing the CTP-RIP 11 to conduct generation of a print job, rasterize processing, and color conversion based on a user's instruction on the client PC 30. In addition, the CTP-RIP client application causes the client PC 30 to display a progress situation of the print job in the offset print system 10 and data stored in the offset print system 10. The CTP-RIP client application provides the user with an interface for inputting information required for the CTP-RIP to generate the print job. Here, information required to create a print job is, for example, the document to be printed, the printer caused to conduct printing, the paper for printing, and the color conversion method.

The print job generated by the CTP-RIP 11 is subject to rasterize processing and color conversion in the CTP-RIP 11 or the digital RIP 21 in accordance with the color conversion method designated by the user. Then, the image based on image data obtained by conducting rasterize processing and color conversion is printed on the paper designated by the user and output, by the offset printer 13 or the digital printer 22. Here, even in a case where the digital printer 22 is designated as an output device by the user, the CTP-RIP 11 can conduct rasterize processing and color conversion on the print job in accordance with the color conversion method designated by the user instead of the digital RIP 21. That is, in the image forming system 1, hybrid printing in which either the offset print system 10 or the digital print system 20 conducts image printing is performed. By the way, hereafter, only the case where the printer designated as the output device by the user is the digital printer 22 will be described to simplify the description.

The digital RIP client application is a program for conducting registration of the paper to be printed by the digital printer 22 and registration and update of paper relating information to the digital RIP 21 based on the user's instruction in the client PC 30. Here, the paper relating information refers to information that associates paper with printer profile and that includes storage places (for example, link information) of the printer profiles. The printer profile is, for example, an ICC profile, and is generated every printer and every paper. Since the printer profile is generated every printer and every paper, it is possible to prevent the color of the print image from varying from printer to printer due to the performance, specifications, and manufacture variations of the printers, and it is possible to prevent the quality of a printed matter and the color of the print image from varying due to a difference in paper property.

Furthermore, the digital RIP client application causes the printer driver to generate the print job and causes the digital RIP 21 to conduct rasterize processing of the print job, based on the user's instruction. In addition, the digital RIP client application causes the client PC 30 to display a progress situation of the print job in the digital print system 20 and data stored in the digital print system 20. The digital RIP client application provides the user with an interface for inputting information required for the client PC 30 to generate the print job by the printer driver. Information required to generate the print, job by the printer driver is, for example, the document to be printed, the digital printer 22 caused to conduct printing, the paper for printing, and the color conversion method. The print job generated by the printer driver in the client PC 30 is not transmitted to the CTP-RIP 11, but transmitted directly to the digital RIP 21 and subject to rasterize processing and color conversion conducted by the digital RIP 21. And the image based on image data obtained by conducting rasterize processing and color conversion is printed on the paper designated by the user and output, by the digital printer 22.

The operation part 305 includes a pointing device such as, for example, a mouse, and a keyboard. The operation part 305 is used to conduct various operations and inputting.

The display part 306 is, for example, a liquid crystal display. The display part 306 displays various kinds of information.

The communication part 307 is an interface for communicating with an external device. The communication part 307 can utilize a network interface according to standards such as Ethernet (registered trademark), SATA (Serial Advanced Technology Attachment), PCI Express, USB, or IEEE 1394, a wireless communication interface such as BLUETOOTH (registered trademark) or IEEE 802.11, or a telephone line interface for connecting to a telephone line.

The client PC 30 having the abovementioned configuration acts as described hereafter.

The CPU 301 activates the CTP-RIP client application. And the CPU 301 transmits the user's instruction on the CTP-RIP client application to the CTP-RIP 11 to cause the CTP-RIP 11 to generate the print job and cause the CTP-RIP 11 to conduct rasterize processing and color conversion of the print job.

The CPU 301 procures the progress situation of the print job in the offset print system 10 and data stored in the offset print system 10 from the CTP-RIP 11 based on the user's instruction on the CTP-RIP client application, and causes the display part 306 to display the progress situation and the data.

The CPU 301 activates the digital RIP client application. And the CPU 301 displays a user interface for conducting registration of the paper to be printed by the digital printer 22 and registration and update of the paper relating information to the digital RIP 21, on the di splay part 306 based on the user's instruction.

The CPU 301 procures the progress situation of the print job in the digital print system 20 and data stored in the digital print system 20 from the digital RIP 21 based on the user's instruction on the digital RIP client application, and causes the display part 306 to display the progress situation and the data.

The CPU 301 generates the print job by the printer driver based on the user's instruction, transmits the print job to the digital RIP 21, and causes the digital RIP 21 to conduct rasterize processing and color conversion of the print job.

Figure 3:
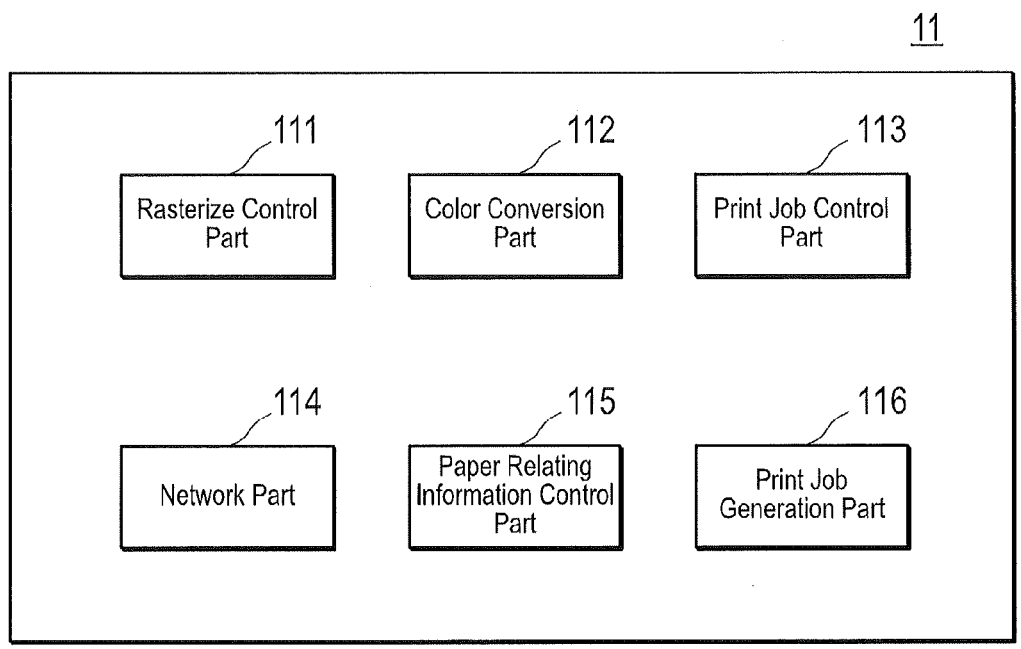
FIG. 3 is a functional block diagram of a CTP-RIP.

FIG. 3 is a functional block diagram of the CTP-RIP.

The CTP-RIP 11 can be configured by using a computer. A basic configuration of the computer that configures the CTP-RIP 11 is similar to the client PC 30 described with reference to FIG. 2, and consequently description thereof will be omitted. With a program installed, the CTP-RIP 11 has functions of respective blocks illustrated in FIG. 3.

The CTP-RIP 11 has functions achieved by a rasterize control part 111, a color conversion part 112, a print job control part 113, a network part 114, a paper relating information control part 115, and a print job generation part 116.

The rasterize control part 111 and the color conversion part 112 function as a rasterize/color conversion unit. The print job control part 113 functions in conjunction with the network part 114 as a print job transmission unit. The paper relating information control part 115 functions as a control unit, and in addition functions in conjunction with the network part 114 as a data reception unit. The print job generation part 116 functions as a setting unit.

The rasterize control part 111 conducts rasterize processing of the print job.

The color conversion part 112 generates a LUT (LookUp Table) based on the printer profile, and conducts color conversion of image data obtained by the rasterize processing, by using the LUT.

The print job control part 113 controls the print job generated by the print job generation part 116, and conducts distribution of the print job to the digital print system 20 and the offset print system 10.

The network part 114 communicates with other systems such as the digital print system 20 and the client PC 30 via the network 40.

The paper relating information control part 115 acquires the paper relating information and the printer profile from the digital print system 20.

The print job generation part 116 receives the user's instruction that is input on the CTP-RIP client application in the client PC 30, and generates the print job based on the user's instruction. In the print setting included in the print job, the paper to be printed by the digital printer 22 is set.

The CTP-RIP 11 acts as described hereafter by the abovementioned functions of the blocks.

The print job generation part 116 generates the print job in accordance with the user's instruction received via the network part 114. Based on the digital printer 22 and the paper designated in print setting in the print job, the paper relating information control part 115 acquires the printer profile for the paper from the digital RIP 21 connected to the digital printer 22 via the network part 114. The paper relating information control part 115 acquires the printer profile from the storage place of the printer profile included in the paper relating information received beforehand.

The rasterize control part 111 generates image data by conducting rasterize processing of print data included in the print job. The color conversion part 112 conducts color conversion of the image data by using an LUT based on the printer profile acquired by the paper relating information control part 115, in accordance with the color conversion method included in the print job. The print job control part 113 can transmit the image data subjected to the color conversion to the digital RIP 21 connected to the digital printer 22 that is designated in the print setting in the print job and cause the digital printer 22 to print the image on the paper and output the paper.

Figure 4:
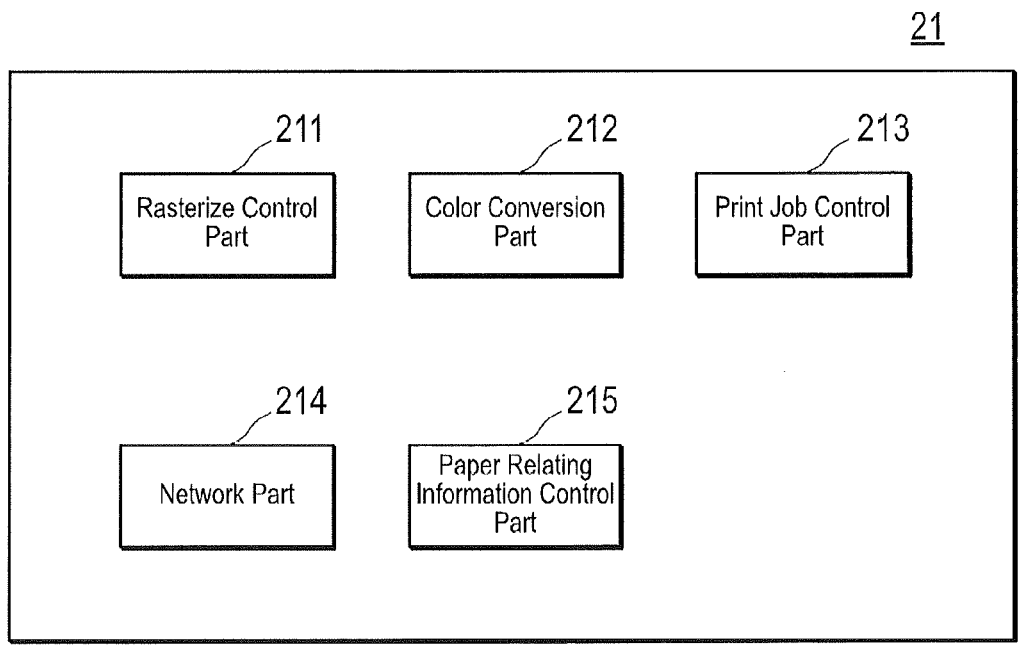
FIG. 4 is a functional block diagram of a digital RIP.

FIG. 4 is a functional block diagram of the digital RIP.

The digital RIP 21 can be configured by using a computer similarly to the CTP-RIP 11. A basic configuration of the computer that configures the digital RIP 21 is similar to that of the client PC 30 described with reference to FIG. 2, and consequently description thereof will be omitted. With a program installed, the digital RIP 21 has functions of blocks illustrated in FIG. 4.

The digital RIP 21 has functions achieved by a rasterize control part 211, a color conversion part 212, a print job control part 213, a network part 214, and a paper relating information control part 215.

The paper relating information control part 215 functions as a storage unit and a registration unit, and functions in conjunction with the network part 214 as a data transmission unit.

The rasterize control part 211 conducts rasterize processing of the print job received from the CTP-RIP 11, except the case where the rasterize processing on the print job is conducted by the CTP-RIP 11 instead. Furthermore, the rasterize control part 211 conducts rasterize processing of the print job received from the client PC 30.

The color conversion part 212 generates the LUT based on the printer profile, and conducts color conversion of image data obtained by rasterize processing by use of the LUT.

The print job control part 213 transmits the print job subjected to the rasterize processing and the color conversion to the digital printer 22.

The network part 214 communicates with other systems such as the offset print system 10 and the client PC 30 via the network 40.

The paper relating information control part 215 stores the printer profile of every paper obtained by measuring color of the printed matter printed by the digital printer 22. Furthermore, the paper relating information control part 215 registers and updates the paper relating information. In the digital RIP client application operating in the client PC 30, the user can cause the paper relating information control part 215 from the client PC 30 to register and update the paper relating information. Update of the paper relating information includes a case where the printer profile associated with the paper is updated by measuring the color of the printed matter again and a case where addition of the paper used in the digital printer 22 causes addition of new association between the paper and the printer profile and addition of the printer profile, for example.

When there is a request from the CTP-RIP 11 or when There is update in the registered paper relating information, the paper relating information control part 215 transmits the paper relating information to the CTP-RIP 11.

When the CTP-RIP 11 conducts rasterize processing and color conversion of the print job, the paper relating information control part 215 transmits the printer profile of every paper to the CTP-RIP 11 in accordance with a request from the CTP-RIP 11.

The digital RIP 21 acts as described hereafter by functions of the abovementioned blocks.

The paper relating information control part 215 stores the printer profile of every paper, and conducts registration and update of the paper relating information. When there is the request from the CTP-RIP 11 or when there is update of the paper relating information, the paper relating information control part 215 transmits the paper relating information to the CTP-RIP 11. Furthermore, when the CTP-RIP 11 conducts rasterize processing and color conversion on the print job, the paper relating information control part 215 transmits the printer profile of the paper requested from the CTP-RIP 11 based on the paper relating information to the CTP-RIP 11 in accordance with the request from the CTP-RIP 11.

The rasterize control part 211 can conduct rasterize processing of the print job received from the CTP-RIP 11 or the client PC 30. The color conversion part 212 can conduct color conversion of the image data obtained by conducting rasterize processing of the print job. The print job control part 213 transmits the print job subjected to the rasterize processing and the color conversion to the digital printer 22 and causes the digital printer 22 to print the image on the paper and output the paper.

Figure 5:
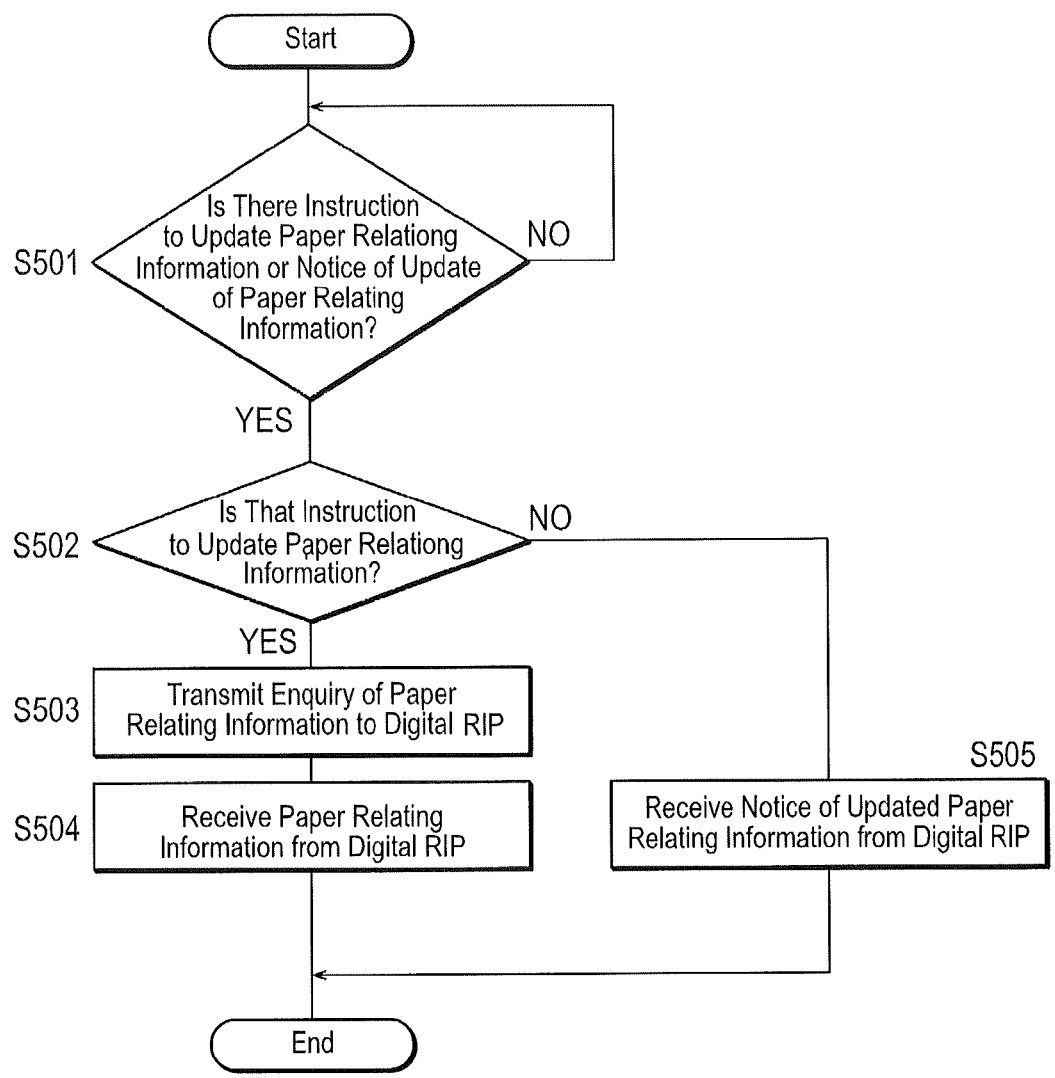
FIG. 5 is a flow chart illustrating processing conducted by a paper relating information control part in the CTP-RIP.

FIG. 5 is a flow chart illustrating processing conducted by the paper relating information control part in the CTP-RIP. The flow chart can be executed by the program installed in the CTP-RIP 11.

The paper relating information control part 115 in the CTP-RIP 11 determines whether there is the user's instruction to update the paper relating information or a notice of update of the paper relating information from the digital RIP 21 (S501). The paper relating information control part 115 determines that there is the instruction to update the paper relating information by receiving the user's instruction to update the paper relating information which is input on the CTP-RIP client application operating in the client PC 30 from the client PC 30.

When it is determined that there is the user's instruction to update the paper relating information (S501: YES, S502: YES), the paper relating information control part 115 in the CTP-RIP 11 transmits enquiry of the paper relating information to the digital RIP 21 (S503). The paper relating information control part 115 receives from the digital RIP 21 a response of the paper relating information to the transmitted enquiry of the paper relating information (S504).

FIGS. 6A and 6B are diagrams illustrating an example of the enquiry of the paper relating information and the response of the paper relating information described in a communication format of a print apparatus. In the example illustrated in FIGS. 6A and 6B, an enquiry of the paper relating information and the response of the paper relating information are described in the JMF (Job Messaging Format).

FIG. 6A shows the enquiry of the paper relating information described in JMF and transmitted from the CTP-RIP 11 to the digital RIP 21. FIG. 6B shows the response of the paper relating information transmitted from the digital RIP 21 to the CTP-RIP 11.

In the enquiry of the paper relating information shown in FIG. 6A, a message command "Query" representing an enquiry is described together with a message command ID in the JMF and a URL (Uniform Resource Locator) of a transmission destination of an update notice is set, as indicated by underlined portions.

In the response of the paper relating information shown in FIG. 6B, a message command "Response" representing a response is described together with a message command ID in the JMF and a URL of a storage place of the printer profile of every paper in the digital print system 20 is described as the paper relating information, as indicated by underlined portions.

Referring back to FIG. 5, when it is determined that there is a notice of update of the paper relating information from the digital RIP 21 (S501: YES, S502: NO), the paper relating information control part 115 in the CTP-RIP 11 receives the notice of update of the paper relating information from the digital RIP 21 (S505).

FIG. 7 is a diagram illustrating an example of the notice of update of the paper relating information described in the JMF.

In the notice of update of the paper relating information shown in FIG. 7, a message command "Signal" representing a notice of state change is described together with a message command ID in the JMF and a URL of a storage place of the printer profile of every paper in the digital print system 20 is described as the paper relating information, as indicated by underlined portions. It is possible for the digital RIP 21 to spontaneously give the notice of update of the paper relating information, for example, when the printer profile is updated every paper.

Figure 8:
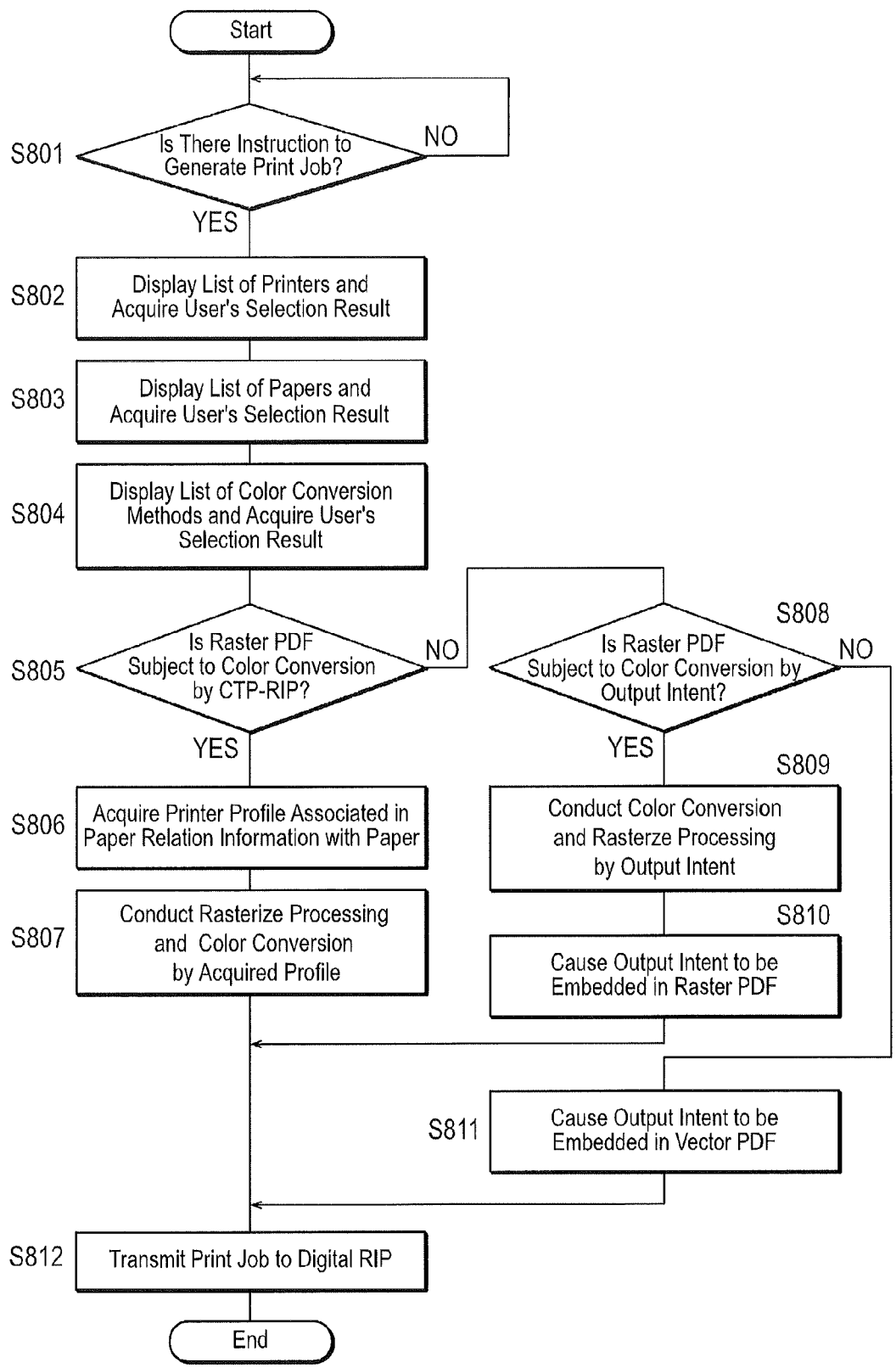
FIG. 8 is a flow chart illustrating processing conducted by a print job control part in the CTP-RIP.

FIG. 8 is a flow chart illustrating processing conducted by the print job control part in the CTP-RIP. The flow chart can be executed by a program installed in the CTP-RIP 11.

The CTP-RIP 11 determines whether there is the user's instruction to generate the print job (S801). The CTP-RIP 11 determines whether there is the user's instruction to generate the print job by receiving the instruction to generate the print job that is input by the user on the CTP-RIP client application operating in the client. PC 30, from the client PC 30.

When it is determined that there is the user's instruction to generate the print job (S801: YES), the CTP-RIP 11 causes the CTP-RIP client application operating in the client PC 30 to display the list of the digital printers 22 and causes the user to select the digital printer 22.

FIGS. 9A to 9C are diagrams illustrating a display of a list of printers, a display of a list of the papers, and a display of a list of the color conversion methods for causing the user to select the digital printer, the paper, and the color conversion method, respectively. FIG. 9A shows the display of the list of the digital printers 22, FIG. 9B shows the display of the list of the papers list, and FIG. 9C shows the display of the list of the color conversion methods.

As shown in FIG. 9A, the list of digital printers 22 available for printing and outputting is displayed to make it possible for the user to select a digital printer by a pull-down menu and a toner printer No. 1 is selected.

The CTP-RIP 11 receives a selection result in the display of the list of the digital printers 22 from the client PC 30 (S802).

The CTP-RIP 11 causes the CTP-RIP client application to display the list of the papers and receives a selection result of the paper in the display of the list of the papers from the client PC 30 (S803).

In FIG. 9B, the list of the paper is displayed to make it possible for the user to select the paper by a pull-down menu and SRA3 coated paper is selected.

The CTP-RIP 11 causes the CTP-RIP client application to display the list of the color conversion methods and receives a selection result of the color conversion method in the display of the list of the color conversion methods from the client PC 30 (S804).

The CTP-RIP 11 generates the print job for causing the digital printer 22 to print the document designated by the user, based on the results of user's selection at the steps S802 to S804.

In FIG. 9C, the list of the color conversion methods is displayed to make it possible for the user to select a color conversion method by a pull-down menu and the color conversion method of causing the CTP-RIP 11 to conduct color conversion of raster PDF which is print data included in the print job is selected.

In the case where the color conversion method of causing the CTP-RIP 11 to conduct color conversion on the raster PDF, which is print data, is selected (S805: YES), the CTP-RIP 11 acquires the printer profile associated in the paper relation information with the paper designated in print setting in a print job, from the digital RIP 21 (S806). The CTP-RIP 11 acquires the printer profile from the storage place of the printer profile associated with the designated paper included in the paper relating information. The CTP-RIP 11 conducts rasterize processing and color conversion of the print job by the acquired printer profile (S807) and transmits the print job to the digital RIP 21 (S812).

FIG. 10 is a diagram illustrating an example of a job ticket included in the print job described in the communication format of the print apparatus and transmitted from the CTP-RIP to the digital RIP. The job ticket refers to instruction information to the printer having the print setting included in the print job as contents. In the example illustrated in FIG. 10, the job ticket is described in the JDF (Job Definition Format).

In the job ticket illustrated in FIG. 10, the color conversion method of causing the CTP-RIP 11 to conduct color conversion of the raster PDF is set as indicated by an underlined portion.

In a case where the color conversion method of conducting color conversion of the raster PDF by the output intent is selected (S805: NO, S808: YES), the CTP-RIP 11 conducts rasterize processing and color conversion of the print job by using the output intent (S809). The CTP-RIP 11 causes the output intent to be embedded in the raster PDF subjected to the rasterize processing and the color conversion (S810) and transmits the resultant print job to the digital RIP 21 (S812).

In a case where the color conversion method of conducting color conversion of the vector PDF by the output intent is selected (S805: NO, S808: NO), the CTP-RIP 11 causes the output intent to be embedded in the vector PDF (S811), and transmits the resultant print job to the digital RIP 21 (S812). In a case where the print data included in the print job is the vector PDF, rasterize processing of the print job is not conducted in the CTP-RIP 11. This is because attribute information is lost by rasterize processing of the print job conducted in the CTP-RIP 11 and consequently outline processing cannot be conducted in the digital RIP 21 resulting in a problem of corrupted outline characters and rubbed fine lines.

Figure 11:
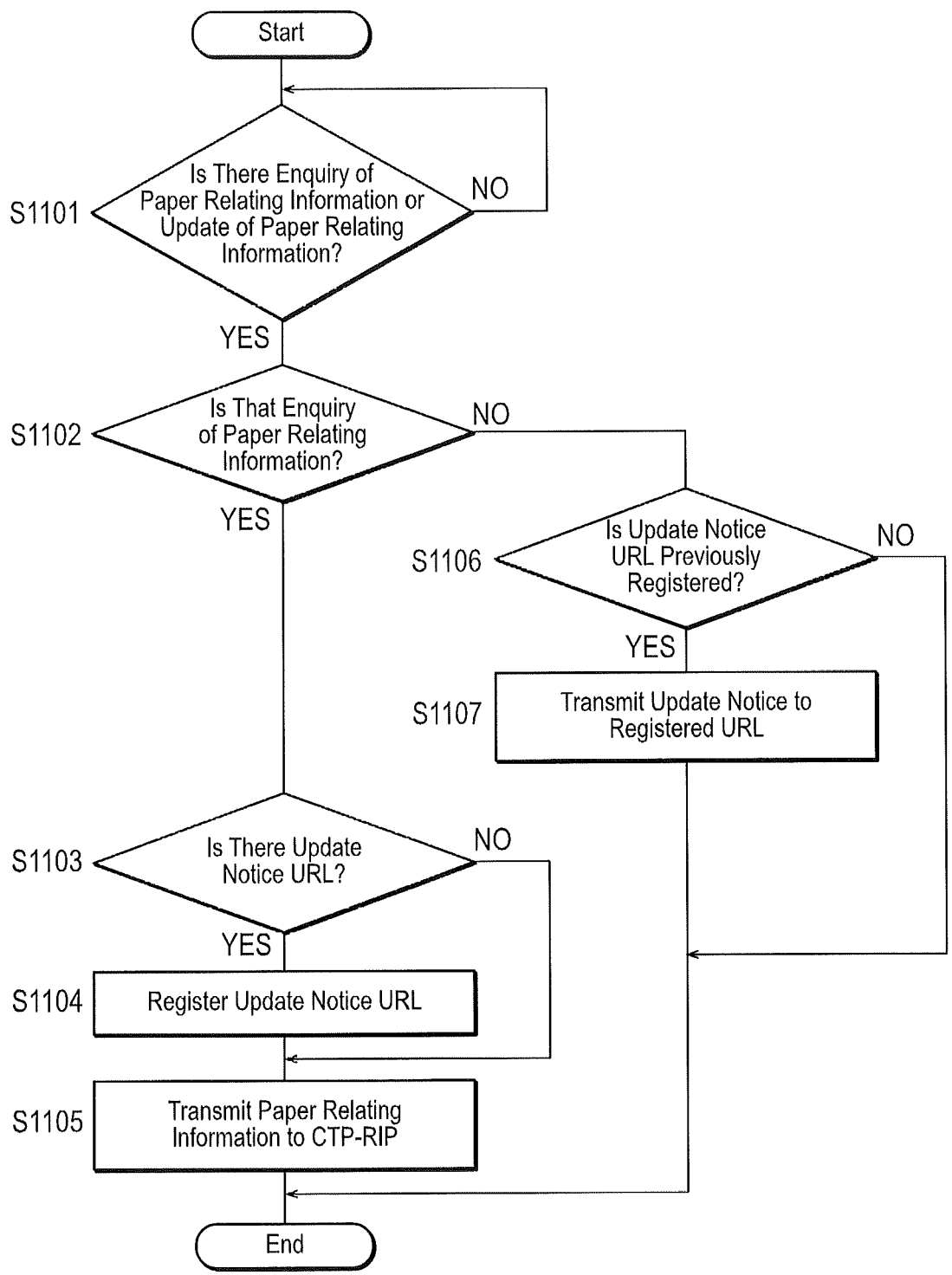
FIG. 11 is a flow chart illustrating processing conducted by the paper relating information control part in the digital RIP.

FIG. 11 is a flow chart illustrating processing conducted by the paper relating information control part in the digital RIP. The flow chart can be executed by a program installed in the digital RIP 21.

The paper relating information control part 215 in the digital RIP 21 determines whether there is an enquiry of the paper relating information from the CTP-RIP 11 or there is update of the paper relating information (S1101). The enquiry of the paper relating information from the CTP-RIP 11 is conducted based on the user's instruction to update the paper relating information that is input on the CTP-RIP client application operating in the client PC 30. Update of the paper relating information is conducted based on the user's instruction to update the paper relating information that is input on the digital RIP client application operating in the client PC 30.

FIGS. 12A and 12B are diagrams illustrating a user interface in the digital RIP client application for causing the user to update and register the paper relating information. FIG. 12A shows the user interface for registering the new paper to be used in the digital printer 22. FIG. 12B shows the user interface for updating or registering association of the papers with the printer profiles.

In FIG. 12A, a state in which A4 coated paper is about to be registered as the paper to be newly used in the digital printer 22 is shown. By the way, FIG. 12A shows the state in which a size, a kind of paper, and a weight of the paper have not yet been selected by the user. However, the user can register these contents every paper in the digital RIP 21 by selecting the size, the kind of the paper, and weight of the paper from the pull-down menu.

In FIG. 12B, the printer profile registered every kind of the paper is shown. The user can update or register the association of the papers with the printer profiles by selecting the newly generated printer profile from a pull-down menu displayed by clicking the printer profile in any one of the kinds of papers including the newly registered papers.

When it is determined that there is the enquiry of the paper relating information from the CTP-RIP 11 (S1101: YES, S1102: YES), the paper relating information control part 215 in the digital RIP 21 registers an update notice URL, if the update notice URL to be notified at the time of next update of the paper relating information is described in the enquiry (S1104). And the paper relating information control part 215 in the digital RIP 21 transmits the paper relating information to the CTP-RIP 11 as a response to the enquiry of the paper relating information from the CTP-RIP 11 (S1105).

When it is determined that there is update of the paper relating information (S1101: YES, S1102: NO), the paper relating information control part 215 in the digital RIP 21 transmits a notice of updated the paper relating information to the update notice URL (S1107) only in a case where the update notice URL to be notified at the time of update of the paper relating information is previously registered (S1106: YES).

FIG. 13 is a flow chart illustrating processing conducted by the print job control part in the digital RIP. The flow chart can be executed by a program installed in the digital RIP 21.

When it is determined that the print job is received (S1301: YES), the print job control part 213 in the digital RIP 21 acquires the color conversion method from the job ticket which is included in the print job and in which the print setting is described (S1302).

In a case where the color conversion method acquired from the job ticket is a method of conducting color conversion of a vector PDF by the output intent (S1303: YES), the print job control part 213 conducts color conversion of the vector PDF by an output intent embedded in the vector PDF included in the print job (S1304). Then, the print job control part 213 conducts pigment, restriction processing of the vector PDF (S1305) and conducts rasterize processing (S1306). The pigment restriction processing refers to preventing an image on the paper from deblurring by restricting a total amount of toner applied one upon another in printing on the paper. The print job control part 213 transmits the image data obtained by conducting rasterize processing of the vector PDF to the digital printer 22 (S1311).

In a case where the color conversion method acquired from the job ticket is a method of conducting color conversion of the raster PDF by the output intent (S1303: NO, S1307: YES), the print job control part 213 conducts color conversion on the vector PDF by the output intent embedded in the raster PDF included in the print job (S1308). Then, the print job control part 213 conducts pigment restriction processing of the raster PDF (S1309), and transmits the image data to the digital printer (S1311).

In a case where the color conversion method acquired from the job ticket is a method of conducting color conversion of the raster PDF in the CTP-RIP 11 (S1303: NO, S1307: NO), the print job control part 213 conducts pigment restriction processing of the raster PDF included in the print job (S1310), and transmits the image data to the digital printer (S1311).

In this way, the image forming system 1 conducts rasterize processing and color conversion of the print job in the CTP-RIP 11 or the digital RIP 21 in accordance with the color conversion method selected from among three kinds by the user. These three kinds of the color conversion methods have the following features, respectively.

That is, according to the color conversion method of conducting color conversion of the raster PDF in the CTP-RIP 11, the raster PDF is subjected to rasterize processing and color conversion conducted by the CTP-RIP 11, and printed and output by the digital printer 22. As a result, it is possible to ensure drawing uniformity between the printed matter obtained from offset print and the printed matter obtained from the digital printer 22 by conducting rasterize processing in the CTP-RIP 11. Furthermore, it is possible to improve expressiveness of the black color because it becomes possible to print expression of the black color on the printed matter using CMYK (Cyan, Magenta, Yellow, and Black) toners with a single color of K-plate toner by conducting color conversion in the CTP-RIP 11.

According to the color conversion method of conducting color conversion of the raster PDF by the output intent, the raster PDF is subjected to rasterize processing and color conversion in a standard color space using the output intent by the CTP-RIP 11. And the raster PDF is further subjected to color conversion in the standard color space by the output intent in the digital RIP 21, and printed and output by the digital printer 22. As a result, it is possible to ensure drawing uniformity between the printed matter obtained from the offset print and the printed matter obtained from the digital printer 22 by conducting rasterize processing in the CTP-RIP 11. On the other hand, attribute information is lost when the rasterize processing is conducted in the CTP-RIP 11, and since the black color is represented by a mixture of CMYK toners, expressiveness of the black color might deteriorate relatively. Furthermore, since color conversion of the print job is conducted twice, the processing time might increase relatively.

According to the color conversion method of conducting color conversion of the vector PDF by the output intent, the vector PDF is not subjected to rasterize processing and color conversion in the CTP-RIP 11, but color conversion is conducted in the standard color space by the output intent and rasterize processing is conducted in the digital RIP 21. As a result, attribute information is not lost in the rasterize processing in the CTP-RIP 11. Therefore, outline processing based on the attribute information can be conducted in the digital RIP 21. Furthermore, the image data after rasterize processing is not transmitted from the CTP-RIP 11 to the digital RIP 21, so that communication volume is reduced and processing time can be reduced. Furthermore, it is possible to improve expressiveness of the black color because it becomes possible to print expression of the black color on the printed matter using CMYK toners with a single color of K-plate toner based on the attribute information by conducting color conversion in the digital RIP 21.

The present embodiment has following effects.

In the hybrid work flow CMS, the paper relating information associating the papers with the printer profiles and including storage places for the printer profiles is registered in each slave RIP. Then, the paper relating information from the slave RIP is received by the master RIP, and the paper on which the printer connected to the slave RIP is caused to form the image is set in the print job. Then, the master RIP receives the printer profile from the storage place for the printer profile associated with the paper, which is included in the paper relating information, and conducts rasterize processing and color conversion of the print job by the received profile instead of the slave RIP. As a result, it is possible to prevent the color of the print image from changing due to rasterize processing and color conversion conducted in different RIPs while keeping the uniformity of drawing of the printed matters, facilitating management of printer profiles among a plurality of RIPs, and implementing improvement of efficiency of working conducted by the user.

In addition, when there is the request from the master RIP or when the registered paper relating information is updated, the paper relating information is transmitted to the master RIP. As a result, the paper relating information is transmitted from the slave RIP to the master RIP as occasion demands, so that it is possible to reduce the communication volume between the slave RIPs and the master RIP and shorten the processing time of the print job. Accordingly, the working efficiency of the user can be further improved.

In addition, transmission of the printer profile of every paper from the slave RIP to the master RIP is conducted in accordance with the request from the master RIP to the slave RIP when the master RIP conducts rasterize processing and color conversion on the print job. As a result, the printer profile needed by the master RIP is transmitted from the slave RIP to the master RIP as occasion demands, so that it is possible to further reduce the communication volume between the slave RIPs and the master RIP and further shorten the processing time of the print job. Accordingly, the working efficiency of the user can be further improved.

Heretofore, the image forming method, the storage medium stored with the program for image forming system, and the image forming system according to the embodiment of the present invention have been described. However, the present invention is not restricted to the abovementioned embodiment.

For example, in the abovementioned embodiment, it is described that each of the CTP-RIP client application and the digital RIP client application operates in the client PC. However, these applications may operate in the CTP-RIP or the digital RIP.

Furthermore, a portion or all of the function implemented by the program in the abovementioned embodiment may be executed by hardware such as a circuit replacing the program.

What is claimed is:

1. An image forming method in an image forming system including a master RIP and at least one slave RIP, said master RIP conducting rasterize processing of a print job for causing a first printer connected to said master RIP to print, and said master RIP being capable of conducting rasterize processing of a print job for causing a second printer connected to said slave RIP to print by said slave RIP, instead of said slave RIP, said image forming method comprising:

step (a) of storing, in said slave RIP, a printer profile of every paper to be printed by said second printer;

step (b) of registering, in said slave RIP, paper relating information associating said printer profile stored at said step (a) with said paper and including a storage place for said printer profile in said slave RIP;

step (c) of transmitting said paper relating information registered at said step (b) and said printer profile stored at said step (a) respectively from said slave RIP to said master RIP;

step (d) of receiving, in said master RIP, said paper relating information and said printer profile transmitted at said step (c);

step (e) of setting, in said master RIP, said paper to be printed by said second printer, in the print job;

step (f) of acquiring, in said master RIP, said printer profile stored in said storage place for said printer profile associated with said paper set at said step (e) in the print job in said paper relating information received at said step (d), from said slave RIP;

step (g) of conducting, in said master RIP, rasterize processing and color conversion of the print job by using said printer profile acquired at said step (f) instead of said slave RIP; and step (h) of transmitting the print job subjected to the rasterize processing and color conversion at said step (g) from said master RIP to said slave RIP.

2. The image forming method as claimed in claim 1, wherein at said step (c), said paper relating information is transmitted to said master RIP when there is a request from said master RIP or said paper relating information registered at said step (b) is updated.

3. The image forming method as claimed in claim 1, wherein at said step (c), said printer profile is transmitted to said master RIP in accordance with a request from said master RIP when said master RIP conducts the rasterize processing and color conversion of the print job at said step (g).

4. A non-transitory computer readable storage medium stored with a program, said program causing an image forming system including a master RIP and at least one slave RIP, said master RIP conducting rasterize processing of a print job for causing a first printer connected to said master RIP to print, and said master RIP being capable of conducting rasterize processing of a print job for causing a second printer connected to said slave RIP to print by said slave RIP, instead of said slave RIP, to execute a process comprising:

process (a) of storing, in said slave RIP, a printer profile of every paper to be printed by said second printer;

process (b) of registering, in said slave RIP, paper relating information associating said printer profile stored in said process (a) with said paper and including a storage place for said printer profile in said slave RIP;

process (c) of transmitting said paper relating information registered in said process (b) and said printer profile stored in said process (a) respectively from said slave RIP to said master RIP;

process (d) of receiving, in said master RIP, said paper relating information and said printer profile transmitted in said process (c);

process (e) of setting, in said master RIP, said paper to be printed by said second printer, in the print job;

process (f) of acquiring, in said master RIP, said printer profile stored in said storage place for said printer profile associated with said paper set in said process (e) in the print job in said paper relating information received in said process (d), from said slave RIP;

process (g) of conducting, in said master RIP, rasterize processing and color conversion of the print job by said printer profile acquired in said process (f) instead of said slave RIP; and process (h) of transmitting the print job subjected to the rasterize processing and color conversion in said process (g) from said master RIP to said slave RIP.

5. The non-transitory computer readable storage medium as claimed in claim 4, wherein in said process (c), said paper relating information is transmitted to said master RIP when there is a request from said master RIP or said paper relating information registered in said process (b) is updated.

6. The non-transitory computer readable storage medium as claimed in claim 4, wherein in said process (c), said printer profile is transmitted to said master RIP in accordance with a request from said master RIP when said master RIP conducts the rasterize processing and color conversion of the print job in said process (g).

7. An image forming system including a master RIP and at least one slave RIP, said master RIP conducting rasterize processing of a print job for causing a first printer connected to said master RIP to print, and said master RIP being capable of conducting rasterize processing of a print job for causing a second printer connected to said slave RIP to print by said slave RIP, instead of said slave RIP, wherein said slave RIP includes a storage unit configured to store a printer profile of every paper to be printed by said second printer, a registration unit configured to register paper relating information associating said paper with said printer profile and including a storage place for said printer profile in said storage unit, and a data transmission unit configured to transmit said paper relating information registered by said registration unit and said printer profile stored in said storage unit respectively to said master RIP, and said master RIP includes a data reception unit configured to receive said paper relating information and said printer profile transmitted by said data transmission unit, a setting unit configured to set, in a print job, said paper to be printed by said second printer, a control unit configured to perform control to cause the data reception unit to receive said printer profile from said storage place, included in said paper relating information received by said data reception unit, for said printer profile associated with said paper which is set in the print job by said setting unit, a rasterize/color conversion unit configured to conduct rasterize processing and color conversion of the print job by said printer profile received by said data reception unit instead of said slave RIP, and a print job transmission unit configured to transmit the print job subjected to the rasterize processing and color conversion conducted by said rasterize/color conversion unit to said slave RIP.

8. The image forming system as claimed in claim 7, wherein said data transmission unit in said slave RIP transmits said paper relating information to said master RIP when there is a request from said master RIP or said paper relating information registered by said registration unit is updated.

9. The image forming system as claimed in claim 7, wherein said data transmission unit in said slave RIP transmits said printer profile to said master RIP in accordance with a request from said master RIP when said rasterize/color conversion unit in said master RIP conducts the rasterize processing and color conversion on the print job.

* * * * *